US011587418B2

(12) United States Patent
Albiston et al.

(10) Patent No.: US 11,587,418 B2
(45) Date of Patent: Feb. 21, 2023

(54) SYSTEM, DEVICE, AND METHOD FOR CAMERA PLACEMENT BASED ON ACCESS TIER ATTRIBUTES

(71) Applicant: MOTOROLA SOLUTIONS, INC., Chicago, IL (US)

(72) Inventors: Wyatt D Albiston, West Valley, UT (US); Kylene Tanner, Bountiful, UT (US); Srinivasan Rajendran, West Valley City, UT (US); Harish Kumar Majeti, Salt Lake City, UT (US); Abdullah T Guney, Sandy, UT (US); Siddharth Mishra, Riverton, UT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 138 days.

(21) Appl. No.: 17/344,999

(22) Filed: Jun. 11, 2021

(65) Prior Publication Data
US 2022/0398907 A1  Dec. 15, 2022

(51) Int. Cl.
*G08B 13/196* (2006.01)
*G06V 20/52* (2022.01)
*H04L 9/40* (2022.01)

(52) U.S. Cl.
CPC ... *G08B 13/19645* (2013.01); *G08B 13/1963* (2013.01); *G08B 13/1968* (2013.01); *H04L 63/101* (2013.01); *H04L 63/105* (2013.01); *H04L 63/107* (2013.01)

(58) Field of Classification Search
CPC ..................................................... G06V 20/52
See application file for complete search history.

(56) References Cited

U.S. PATENT DOCUMENTS

| 10,915,230 B1* | 2/2021 | Leboulleux | ............. G06F 9/451 |
| 2016/0105644 A1* | 4/2016 | Smith | .................. G08B 29/185 |
| | | | 348/159 |
| 2016/0240054 A1 | 8/2016 | Wang et al. | |
| 2019/0171832 A1* | 6/2019 | Dowlatkhah | ....... G06F 21/6218 |
| 2019/0327450 A1* | 10/2019 | Malik | ..................... G06F 16/29 |

FOREIGN PATENT DOCUMENTS

| KR | 101496871 B1 | 3/2015 |
| KR | 101586026 B1 | 1/2016 |
| KR | 102024694 B1 | 9/2019 |

* cited by examiner

*Primary Examiner* — Brian T Pendleton
*Assistant Examiner* — Frank Johnson (57) ABSTRACT

A system, device, and method for camera placement based on access tier attributes is disclosed. The method includes correlating, by an at least one electronic processor, a geographical location and existing tiered camera deployments with electronically stored indications of crime rates across a geographic area associated with a security agency. The method also includes generating, by the at least one electronic processor, at least one new proposed security camera deployment at at least a first proposed location in the geographic area associated with the security agency having a proposed tier selected from one of a plurality of tiers determined as a function of the correlating.

16 Claims, 5 Drawing Sheets

SYSTEM, DEVICE, AND METHOD FOR CAMERA PLACEMENT BASED ON ACCESS TIER ATTRIBUTES

BACKGROUND

Security cameras are increasingly being deployed, which may collect and store video locally and/or upload video to a central security database. However, visualizing the location and attributes of all cameras in a given area, as well as choosing where to place new cameras or choosing where to move existing cameras, is a time consuming and difficult process, prone to error based in part on a lack of visual relationships between existing cameras and gaps in camera access rights.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As discussed earlier, visualizing the location and access tier attributes of all cameras in a given area, relative to current and/or historical crime rates, for use in determining where to place cameras based on access tiers is time consuming and difficult, and prone to error. Thus, there exists a need for an improved method, device, and system for determining suggested camera placements based on access tier attributes.

There are many factors to consider when placing a new camera or relocating an existing camera, such as, the actual location and direction to point it, the zoom and field of view attributes of the camera, interaction and overlap coverage between all cameras, access tiers, and other factors based on camera classifications and other camera parameters. Using some or all of the available sources of camera data, metadata, access tier classifications, and other parameters, via a machine learning and/or artificial intelligence, to provide a recommendation for the placement of a new camera (having a particular determined access tier) or relocating an existing camera (having a particular determined access tier) would allow for more efficient, error free, lower cost, and easily visualized automated processes to determining where, based on current and/or historical crime rates, certain access tiers of cameras should be distributed, installed, and configured. As a result, a responding public security agency can ensure that cameras with appropriate access capabilities are located and accessible based on the determined real-time, historical and/or predicted levels of detected crimes in corresponding geographic jurisdictions being protected by those corresponding agencies, and ease of access to relevant video evidence can be further ensured for crimes being predicted to occur in the future.

In accordance with one example embodiment, there is provided a method for facilitating security camera-related changes as a function of stored indications of existing tiered camera deployments and crime rates. The method includes retrieving, by an at least one electronic processor of a computing device under control by or associated with a public, enterprise, or commercial security agency, from an electronic database, existing tiered camera deployment entries. Each entry in the database includes a geographic location of the respective existing tiered camera deployment and a respective access tier identifier selected from one of at least a first tier in which the security agency has full control over or ownership of the existing tiered camera deployment, a second tier in which the security agency has live video access for the existing tiered camera deployment but less than full control or ownership, and a third tier in which the security agency has no live video access for the existing tiered camera deployment but previously recorded video is obtainable. The method also includes retrieving, by the at least one electronic processor, electronically stored indications of crime rates across a geographic area associated with the security agency. The crime rates vary in intensity over the geographic area. The method also includes correlating, by the at least one electronic processor, the geographical location and the existing tiered camera deployments with an electronically stored indication of crime rates across the geographic area associated with the security agency. The method also includes generating, by the at least one electronic processor, at least one new proposed security camera deployment at at least a first proposed location in the geographic area associated with the security agency having a proposed tier selected from the one of the first, second, and third tiers determined as a function of the correlating. The method also includes causing to be displayed, by the at least one electronic processor, at least one of the proposed tier and the new proposed security camera deployment having the first proposed location via a display device communicatively coupled to at least one input device operable to approve or reject the new proposed security camera deployment.

The generating of the new proposed security camera deployment in the above-mentioned method may, in at least one example, further include dividing the geographic area into substantially similarly sized geometric units, assigning a crime score to each geometric unit based on a determined level of real-time or historical crime occurring within that geometric unit, assigning a camera access tier score to each geometric unit based on access tiers of one or more cameras available within that geometric unit, generating a difference score for each geometric unit based on a difference between the corresponding camera access tier score and corresponding crime score for that geometric unit, and selecting one or more of the geometric units having a highest difference score as the new proposed tiered camera deployment.

The above-mentioned method may, in at least one example, further include one of: i) detecting user input approving the new proposed security camera deployment having the first proposed location and the proposed tier via the input device, and ii) receiving user input transmitted from a reviewing agent computing device approving the new proposed security camera deployment having the first proposed location, and the above-mentioned method may also include: a) responsively generating and transmitting orders to request installation of the new proposed security camera deployment at the first proposed location; or b) responsively causing to be displayed a second new proposed security camera deployment having a second proposed location different from the first proposed location, determined in light of the approved new proposed security camera deployment, via the display device, and transmitting the second proposed security camera deployment having the second proposed location different from the first proposed location, determined in light of the approved new proposed security camera deployment, to a reviewing agent computing device.

The above-mentioned method may, in at least one example, further include providing indications, via the display device, of each of existing tiered camera deployments at the third tier and an input mechanism by which a copy of locally stored video content can be requested to a registered owner of each second tier camera.

In accordance with another example embodiment, there is provided a system that includes an at least one processor and an at least one memory coupled to the at least one processor. The at least one memory contains a set of instructions thereon that when executed by the at least one processor cause the at least one processor to perform a set of functions. The set of functions includes retrieving existing tiered camera deployment entries. Each entry in the database includes a geographic location of a respective existing tiered camera deployment. Each entry in the database also includes a respective access tier identifier selected from one of at least a first tier in which a security agency has full control over or ownership of the existing tiered camera deployment, a second tier in which the security agency has live video access for the existing tiered camera deployment but less than full control or ownership, and a third tier in which the security agency has no live video access for the existing tiered camera deployment but previously recorded video is obtainable. The set of functions also includes retrieving electronically stored indications of crime rates across a geographic area associated with the security agency. The crime rates varying in intensity over the geographic area. The set of functions also includes correlating the geographic location and the tier of the existing tiered camera deployments with an electronically stored indication of crime rates across the geographic area associated with the security agency. The set of functions also includes generating at least one new proposed security camera deployment at at least a first proposed location in the geographic area associated with the security agency having a proposed tier selected from the one of the first, second, and third tiers determined as a function of the correlating. The set of functions also includes causing to be displayed at least one of the proposed tier and the new proposed security camera deployment having the first proposed location via a display device communicatively coupled to at least one input device operable to approve or reject the new proposed security camera deployment.

In accordance with yet another example embodiment, there is provided a non-transient computer readable medium storing program instructions for causing a computer to perform a set of functions. The set of functions includes retrieving, from an at least one electronic memory of the computer, existing tiered camera deployment entries. Each entry in the database includes a geographic location of a respective existing tiered camera deployment. Each entry in the database also includes a respective access tier identifier selected from one of at least a first tier in which the security agency has full control over or ownership of the existing tiered camera deployment, a second tier in which the security agency has live video access for the existing tiered camera deployment but less than full control or ownership, and a third tier in which the security agency has no live video access for the existing tiered camera deployment but previously recorded video is obtainable. The set of functions also includes retrieving, from the at least one electronic memory of the computer, electronically stored indications of crime rates across a geographic area associated with the security agency. The crime rates vary in intensity over the geographic area. The set of functions also includes correlating the geographic location and the existing tiered camera deployments with an electronically stored indication of crime rates across the geographic area associated with the security agency. The set of functions also includes generating at least one new proposed security camera deployment at at least a first proposed location in the geographic area associated with the security agency having a proposed tier selected from the one of the first, second, and third tiers determined as a function of the correlating. The set of functions also includes causing to be displayed, via a display communicatively coupled to the computer, at least one of: the proposed tier, and the new proposed security camera deployment, having the first proposed location, to be approved or rejected by operation of at least one input device of the computer.

Each of the above-mentioned embodiments will be discussed in more detail below, starting with example system and device architectures of the system in which the embodiments may be practiced, followed by an illustration of processing blocks for achieving an improved technical method, device, and system for camera placement based on access tier attributes.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
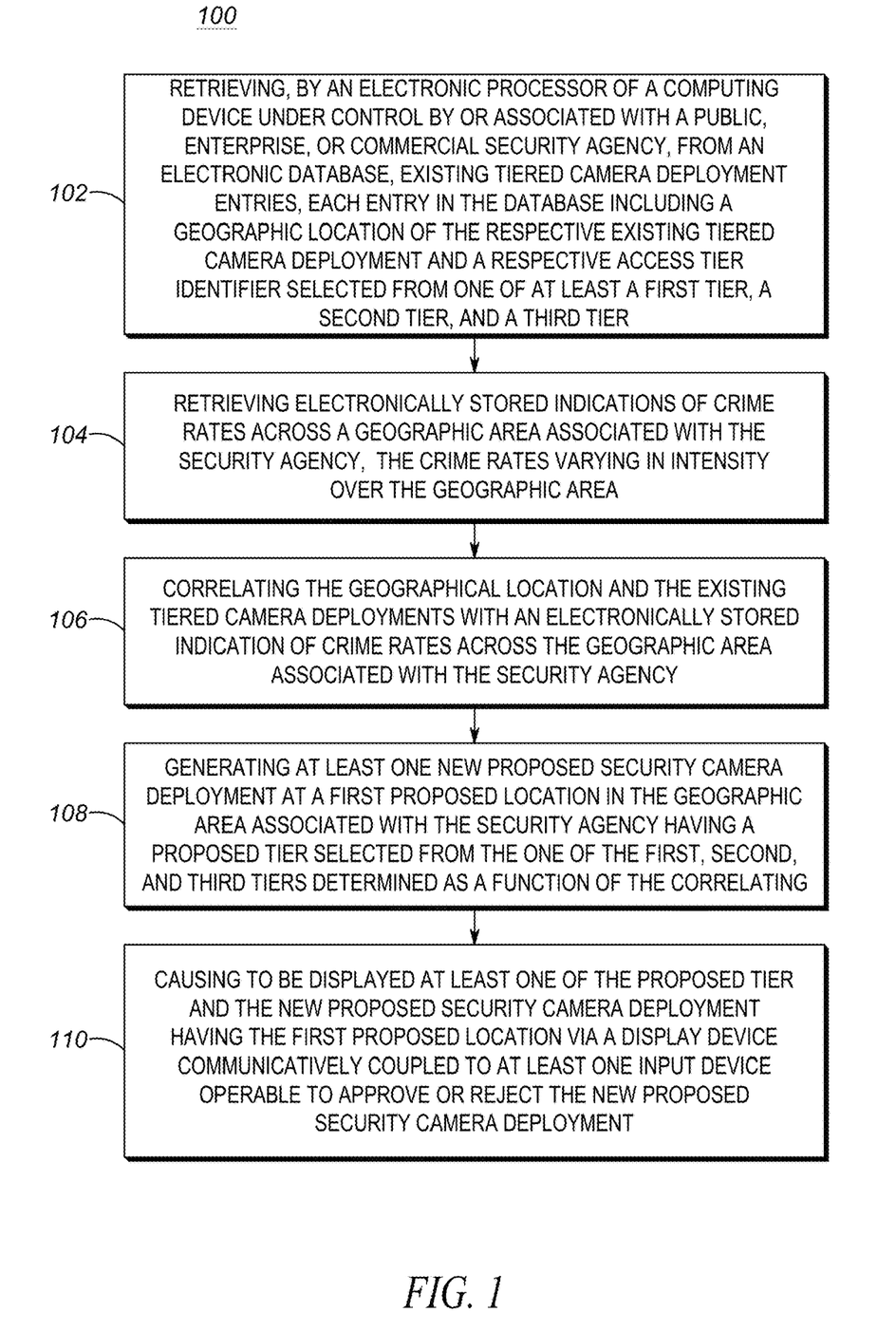
FIG. 1 is a flowchart of a process for determining one or more suggested camera placements based on access tier attributes, in accordance with some example embodiments.

Attention is first directed to FIG. 1, which depicts a flowchart of a process for determining one or more suggested camera placements based on access tier attributes, in accordance with some example embodiments. The flowchart 100 comprises a plurality of blocks that result in providing a recommended output of camera placement of a camera at a particular determined access tier.

As depicted in block 102, process 100 begins where an electronic processor of an electronic computing device under control by, or associated with a public, enterprise, or commercial security agency, retrieves, from an electronic database, existing tiered camera deployment entries, each entry in the database including a geographic location of the existing tiered camera deployment and an access tier identifier selected from one of at least a first tier in which the security agency has full control over or ownership of the existing tiered camera deployment, a second tier in which the security agency has real-time access to a video stream of the existing tiered camera deployment but not full control or ownership, and a third tier in which the security agency has no real-time access to a video stream of the existing tiered camera deployment but may obtain previously recorded video at a later time.

At block 104, the electronic computing device retrieves electronically stored indications of crime rates across a geographic area associated with the security agency, the crime rates varying in intensity over the geographic area.

At block 106, the electronic computing device correlates the geographical location and the plurality of tiers of the existing tiered camera deployments with an electronically stored indication of crime rates across the geographic area associated with the security agency.

At block 108, the electronic computing device generates at least one new proposed security camera deployment at a first proposed location in the geographic area associated with the security agency having a proposed tier selected from the one of the first, second, and third tiers determined as a function of the correlating. Also, it will be further understood that the geographic area may, in one or more examples, be divided into substantially similarly sized geometric units. These geometric units and their potential application have been herein previously described. Also as previously mentioned, a difference score for each geometric unit can be generated based on a difference between the corresponding camera access tier score and a corresponding crime score for that geometric unit. In at least one example (i.e. for a new proposed security camera deployment) camera selection may be:

One or more cameras at the first tier in the case where geometric unit(s) have a highest difference score relative to other geometric units;

One or more cameras at the second tier in the case where geometric units have a difference score that is not the highest or the lowest relative to other geometric units; and Not selected at all in the case where geometric unit(s) having a lowest difference score relative to other geometric units.

At block 110, the electronic computing device causes to be displayed at least one of the proposed tier and the new proposed security camera deployment having the first proposed location via a display device communicatively coupled to at least one input device operable to approve or reject the new proposed security camera deployment.

Figure 2:
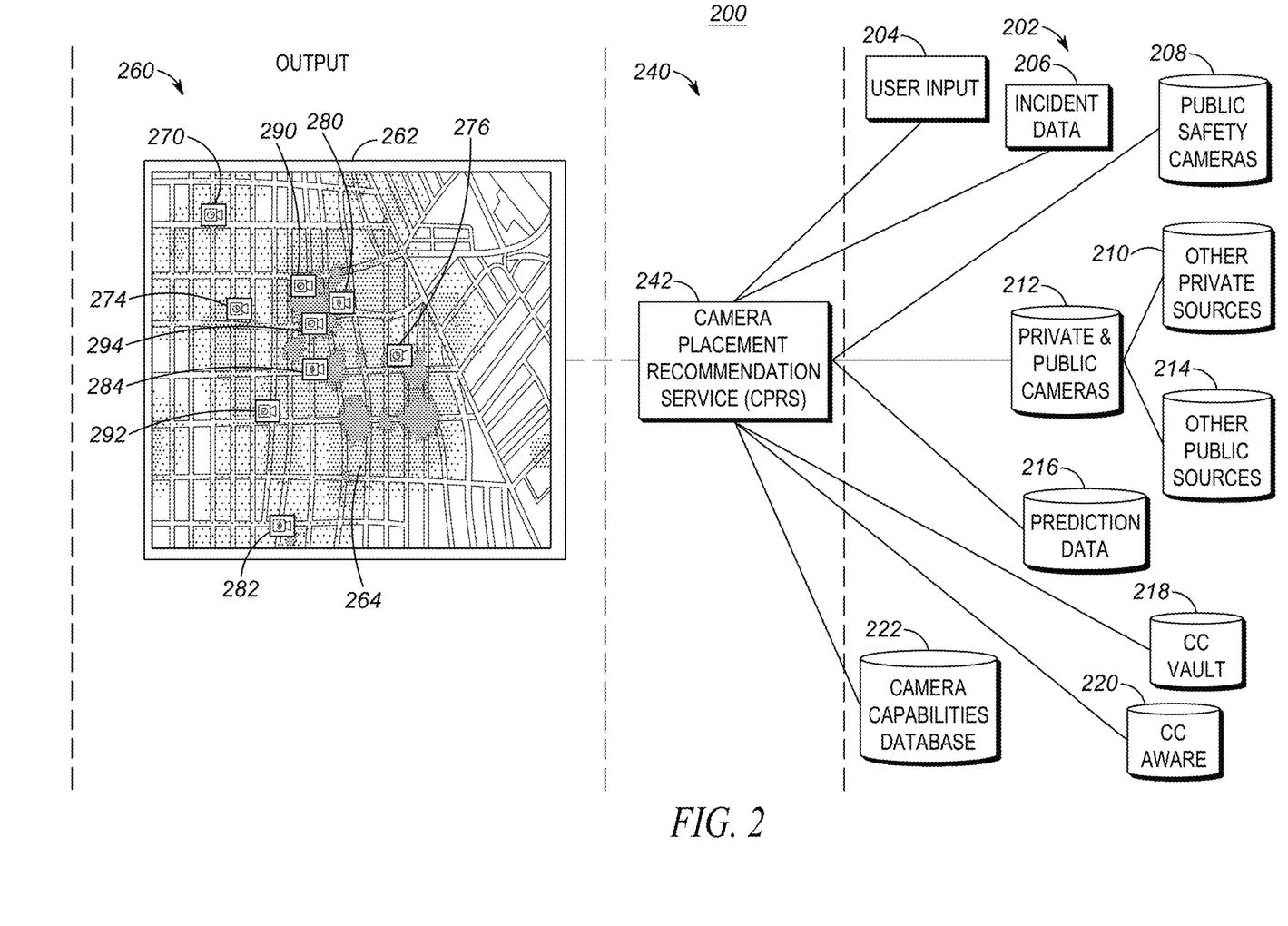
FIG. 2 is a system diagram illustrating an example architecture for determining suggested camera placements based on access tier attributes, in accordance with some example embodiments.

FIG. 2 diagrammatically illustrates a system 200 in accordance with some example embodiments. Depicted in respect of the illustrated architecture are a plurality of storage repositories 202 that provide inputs to a processor and software 240 to generate an output to indicate a recommended placement of a new or existing camera as depicted in output map 260. In one embodiment, block 242 (forming a part of the processor and software 240) represents software to perform the analysis and recommendation for the camera placement, wherein the software represents artificial intelligence and machine learning that will be discussed later in this figure. Also, in another example, the block 242 represents custom hardware designed for software execution. In some examples, the plurality of storage repositories could provide at least one of the following: source of user input (block 204), crime incident data related to public security (block 206), camera metadata from different camera sources (including public safety cameras 208, and private & public cameras 212 that includes other private sources 210 and other public sources 214, prediction data (block 216), camera image samples from various commercial aggregate repositories, CommandCentral (CC) Vault 218 and CC Aware 220. For example, the following schemas are depicted for the crime incident data and camera registration data. In some examples, the user input is changing the position or orientation or both of a camera to accommodate an obstruction. Also, in some examples, the prediction data is a predetermined area assigned a numerical likelihood of a crime occurring, crime type, and/or incident data supporting the prediction. However, one skilled in the art appreciates utilizing different schemas for the organization of the data in a database as needed for their relevant application, memory size, latency, and data flows.

The processor and software instructions 240 could store and process one or more machine learning algorithms and/or deep learning algorithms as software in the block 242, and may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like.

However, it is possible that generalized linear regression algorithms, random forest algorithms, support vector machine algorithms, gradient boosting regression algorithms, decision tree algorithms, generalized additive models, and the like could optionally be selected over neural network algorithms, deep learning algorithms, evolutionary programming algorithms, and the like, in some public security environments. However, any suitable machine learning algorithm and/or deep learning algorithm is within the scope of present examples. As discussed earlier, the algorithms would analyze the inputs received from the storage repositories 202 and analyze the relevant tiers and relevant camera capabilities database (block 222) that is accessible within the storage repositories 202 to generate an output to indicate a recommended placement of a new or existing camera as depicted in output map 260. More detail and discussion on this process will be depicted in the following figures.

Furthermore, the block 242 may include, but are not limited to, algorithms for one or more of: setting different criteria for tiers, camera capability, and different thresholds and analysis based on real-time crime rates, historical crime rates and/or predicted crime rates. For example, the camera capability could include, but is not limited to, custom alerts, motion-detection night view, 180 or 360-degree field of view, remote focus and high zoom ratio, cloud video storage, weather proof/hardness, and remote tilt control.

Figure 3:
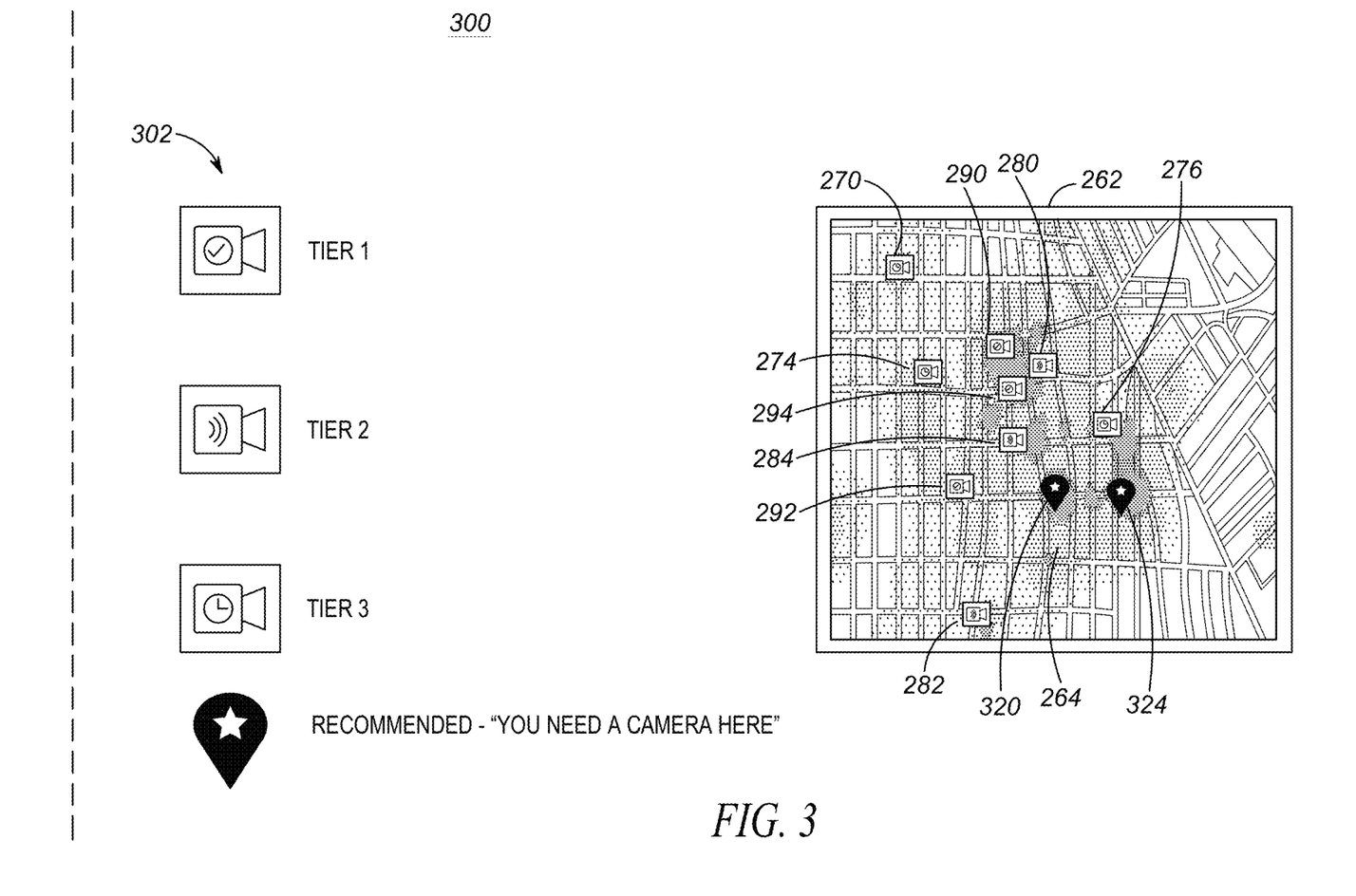
FIG. 3 is a diagram of an example graphical user interface for displaying determined camera placements based on access tier attributes, in accordance with some example embodiments.

Attention is now directed to FIG. 3, which depicts a graphical user interface 300 for displaying camera placements based on a tier classification and a recommended placement for a new or existing camera in accordance with some example embodiments. The graphical user interface depicts a plurality of different tiers for existing cameras based at least in part on the type of control or access, that overlays a map 264 (within graphical user interface region 262) that depicts geographical locations of the cameras with real-time and historical crime rates. In some examples, the different tiers could include some or all of the following. A first tier (for example, camera icons 290, 292 and 294) in which the security agency has full control over or ownership of the existing tiered camera deployment, a second tier (for example, camera icons 280, 282 and 284) in which the security agency has live video access for the existing tiered camera deployment but less than full control or ownership, and a third tier (for example, camera icons 270, 274 and 276) in which the security agency has no live video access to the existing tiered camera deployment but may obtain previously recorded video. The map would then show the different tiers as well as the relevant cameras for each tier in a legend 302. Finally, star icons 320 and 324 depict suggestions for the placement of two new cameras. However, this example is not limited to recommending two cameras. Also, suggestions for new cameras need not be an entirely new add where no camera existed before. Other possibilities include carrying out an upgrade to make a third tier camera a second tier camera, make a second tier camera a first tier camera, etc. Also, although icons are employed in the illustrated example embodiment, it will be understood that other various suitable forms of displaying indications are also contemplated.

As described earlier, the tier definitions were determined by ownership and control. However, many other factors and attributes could be included to determine a tier classification. For example, the camera attributes with respect to quality and resolution may impact a determination of the tier classification used. However, one skilled in the art appreciates utilizing different criteria to include more control features, more or less tiers, zoom capability, packaging and durability features, etc.

In at least one example embodiment, a tier selection matrix may be used for classification as to the tier within which any given camera would belong to. An example of a tier selection matrix is provided in Table 1 below.

TABLE 1

Example Tier Selection Matrix

| Tier | Direct Access | No Ownership but Full Control | Ownership/ Full Control/ Remote Access | High Resolution Camera | Mid-Quality Camera | Low-Quality Camera |
|---|---|---|---|---|---|---|
| Tier 1 | Required | Required | Required | Required | N/A | N/A |
| Tier 2 | Optional | Required | Optional | Optional | Required | Optional |
| Tier 3 | Required | Optional | Optional | Optional | Optional | Required |

Figure 4:
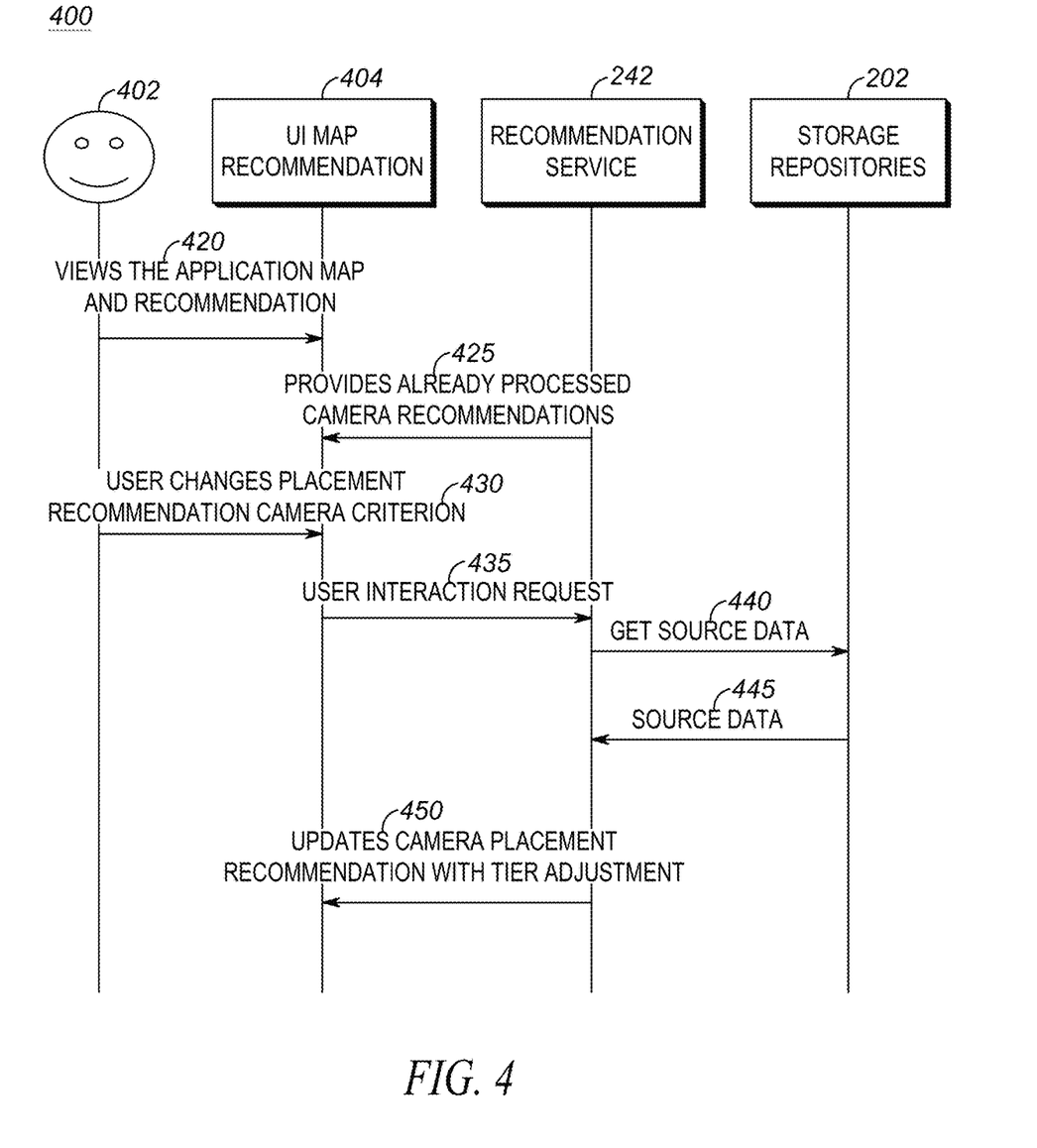
FIG. 4 is a message flow diagram illustrating communications exchanged in an example process for determining camera placements based on access tier attributes, in accordance with some example embodiments.

Attention is now directed to FIG. 4, which depicts is a flowchart of a method 400 for a workflow for determining a new camera placement, in accordance with some example embodiments. This figure provides a detailed workflow to represent interactions between the user and the system provided and described earlier in connection with FIG. 2. FIG. 4 depicts a user 402, a User Interface Map Recommendation 404, the Recommendation Service 242, and the storage repositories 202 (earlier discussed in connection with FIG. 2). Also, a user can request adjustments, overrides, or be used as part of the recalculation to allow for input and adjustments to utilize a better-quality camera or request access from a third party or other security agency.

In the first dataflow depicted (420), the user, 402, interacts with the camera placement system by requesting to view the application map (for example, the output map 260 from FIG. 2) and recommendations.

Next, Recommendation Service 242 provides (425) already processed camera recommendations to the User Interface Map Recommendation 404.

In the next dataflow depicted (430), the user 402 changes the placement recommendation camera criterion that results in a user interaction request (435) to the Recommendation Service 242. Consequently, this initiates multiple Source Data requests (shown in FIG. 4 as "Get Source Data 440" and "Source Data 445") from the storage repositories 202 (earlier discussed in connection with FIG. 2). In the illustrated method 400, the storage repositories 202 include Crime Incident and Prediction Sources, Camera Video Data, Command Central Aware Camera Directory, and other Custom Sources to include Public or other sources. Based on all those source data results, updates to camera placement recommendation with tier adjustment is performed (450).

Figure 5:
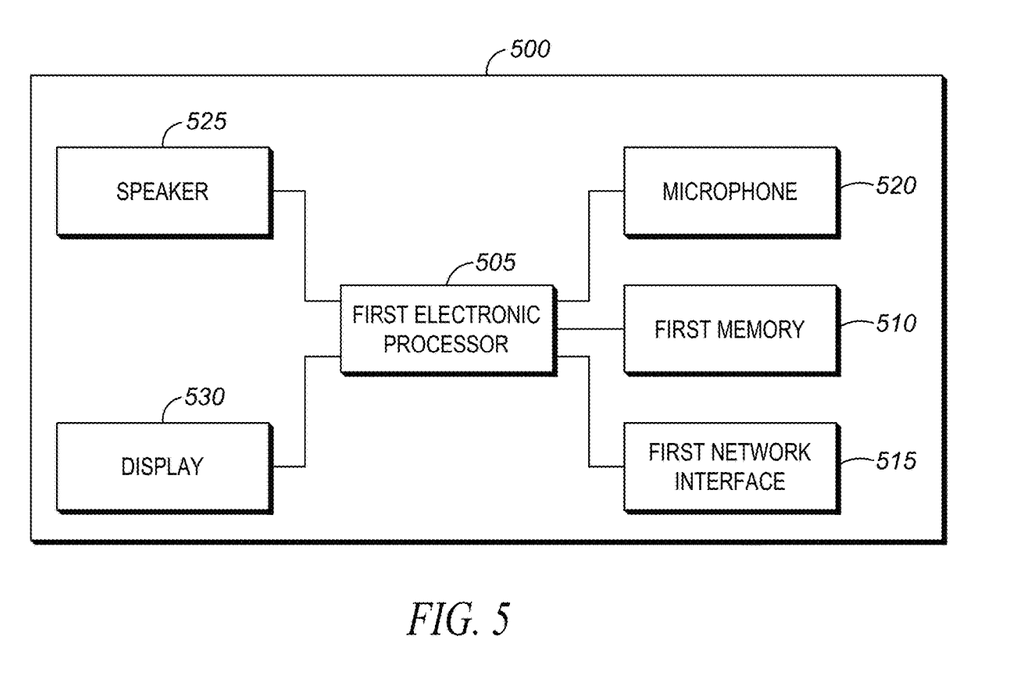
FIG. 5 is a diagram of an example computing device for determining camera placements based on access tier attributes, in accordance with some example embodiments.

Attention is directed to FIG. 5, which illustrates an electronic processing device 500 for determining camera placements based on access tier attributes, in accordance with some example embodiments. The electronic processing device 500 may implement the block 242 shown in FIG. 2 and may include a first electronic processor 505 (for example, a microprocessor or other electronic device). The first electronic processor 505 includes input and output interfaces (not shown) and is electrically coupled to a first memory 510, a first network interface 515, a microphone 520, a speaker 525, and a display 530. In some examples, the electronic processing device 500 includes fewer or additional components in configurations different from that illustrated in FIG. 5. For instance, the electronic processing device 500 may additionally include a push-to-talk button and/or a camera, either or both of which may be used to allow the call taker/dispatcher to participate in one of the audio and/or audio/video calls forwarded to the electronic processing device 500, or to review video generated by cameras within a security system to which the cameras belong. As another example, the electronic processing device 500 may include one or more additional input devices such as a computer mouse and/or a keyboard that receive inputs from a user of the electronic processing device 500. In some examples, the electronic processing device 500 performs functionality in addition to or other than the functionality described below. In still further examples, the electronic processing device 500 may not include a the first network interface 515, the microphone 520, the display 530, and/or the speaker 525.

The first memory 510 may include read only memory (ROM), random access memory (RAM), other non-transitory computer-readable media, or a combination thereof. The first electronic processor 505 is configured to receive instructions and data from the first memory 510 and execute, among other things, the instructions. In particular, the first electronic processor 505 executes instructions stored in the first memory 510 to perform the methods described herein, including but not limited to the electronic processing device 500 operations described with respect to FIG. 1 and its associated text. In some examples, some or all of the first electronic processor 505 and the first memory 510 is implemented on devices located at an on-premises apparatus, while in other examples, some or all of the first electronic processor 505 and the first memory 510 may be located at a remote cloud-computer cluster accessible via one or more wired and/or wireless networks.

The first memory 510 may further store, permanently or temporarily, all or portions of one or more of the databases illustrated, for example, in FIG. 2 and associated text, among other electronically created, modified, and/or stored content.

The first network interface 515 electronically sends and receives data to and from network-addressable electronic devices that may form part of the system 200 in FIG. 2, among other devices. In some examples, the first network interface 515 includes one or more transceivers for wirelessly communicating with network-addressable electronic devices that may form part of the system 200 in FIG. 2. Alternatively, or in addition, the first network interface 515 may include a connector or port for receiving a wired connection for communicating with network-addressable electronic devices that may form part of the system 200 in FIG. 2, such as an Ethernet cable. The first electronic processor 505 may receive one or more sensor or video data feeds through the first network interface 515 (for example, data feeds generated by one or more of cameras).

The first electronic processor 505 may output text and graphics to the (connected) display 530, the (connected) speaker 525, or to some other electronic recipient via the first network interface 515, among other possibilities.

The display 530 displays images, video, text, and/or data to the subject user, a supervisor, or other individual. The display 530 may be a liquid crystal display (LCD) screen or an organic light emitting display (OLED) display screen. In some examples, a touch sensitive input interface may be incorporated into the display 530 as well, allowing the subject user or supervisor to interact with content provided on the display 530. In some examples, the speaker 525 and the display 530 are referred to as output devices that present data feeds to a subject user or supervisor at the electronic computing device 500. In some examples, the microphone 520, a computer mouse, and/or a keyboard or a touch-sensitive display are referred to as input devices that receive input from a subject user or supervisor at the electronic processing device 500.

Hence, provided herein is a method, software, and system for relocating an existing camera or placing a new camera based on a tier scheme and other inputs relating to crime rates and camera capabilities. For example, different tiers and associated ownership and control were defined and facilitated an automated analysis of recommending a new location for an existing or new camera based at least in part on crime rates or camera capabilities, or both.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot correlate a geographical location and tiered camera deployments with stored crime rates indicia, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for facilitating security camera-related changes as a function of stored indications of existing tiered camera deployments and crime rates, the method comprising:

retrieving, by an at least one electronic processor of a computing device under control by or associated with a public, enterprise, or commercial security agency, from an electronic database, existing tiered camera deployment entries, each entry in the database including a geographic location of the respective existing tiered camera deployment and a respective access tier identifier selected from one of at least a first tier in which the security agency has full control over or ownership of the existing tiered camera deployment, a second tier in which the security agency has live video access for the existing tiered camera deployment but less than full control or ownership, and a third tier in which the security agency has no live video access for the existing tiered camera deployment but previously recorded video is obtainable;

retrieving, by the at least one electronic processor, electronically stored indications of crime rates across a geographic area associated with the security agency, the crime rates varying in intensity over the geographic area;

correlating, by the at least one electronic processor, the geographical location and the existing tiered camera deployments with the electronically stored indications of crime rates across the geographic area associated with the security agency;

generating, by the at least one electronic processor, at least one new proposed security camera deployment at at least a first proposed location in the geographic area associated with the security agency having a proposed tier selected from the one of the first, second, and third tiers determined as a function of the correlating; and causing to be displayed, by the at least one electronic processor, at least one of the proposed tier and the new proposed security camera deployment having the first proposed location via a display device communicatively coupled to at least one input device operable to approve or reject the new proposed security camera deployment.

2. The method of claim 1, wherein the crime rates comprise at least one of real-time, historical, and predicted crime rates.

3. The method of claim 1, the generating of the new proposed security camera deployment further includes consideration of camera capabilities.

4. The method of claim 3, wherein the camera capabilities considered include at least one of field of view, zoom ratio, weather hardness, and remote tilt control.

5. The method of claim 1, wherein the generating of the new proposed security camera deployment further includes dividing the geographic area into substantially similarly sized geometric units, assigning a crime score to each geometric unit based on a determined level of real-time and historical crime occurring within that geometric unit, assigning a camera access tier score to each geometric unit based on access tiers of one or more cameras available within that geometric unit, generating a difference score for each geometric unit based on a difference between the corresponding camera access tier score and corresponding crime score for that geometric unit, and selecting one or more of the geometric units having a highest difference score as the new proposed security camera deployment.

6. The method of claim 5, wherein the selected one or more of the geometric units having the highest difference score as the new proposed security camera deployment includes a camera at the first tier.

7. The method of claim 5, further comprising selecting one or more of the geometric units having a difference score that is not the highest or the lowest as a further new proposed security camera deployment at the second tier.

8. The method of claim 5, further comprising refraining from selecting one or more of the geometric units having a lowest difference score for any further tiered camera deployment.

9. The method of claim 1, further comprising:
one of:
detecting user input approving the new proposed security camera deployment having the first proposed location and the proposed tier via the input device, and
receiving user input transmitted from a reviewing agent computing device approving the new proposed security camera deployment having the first proposed location; and
responsively generating and transmitting orders to request installation of the new proposed security camera deployment at the first proposed location.

10. The method of claim 1, further comprising:
one of:
detecting user input approving the new proposed security camera deployment having the first proposed location and the proposed tier via the input device, and
receiving user input transmitted from a reviewing agent computing device approving the new proposed security camera deployment having the first proposed location; and
one of:
responsively causing to be displayed a second new proposed security camera deployment having a second proposed location different from the first proposed location, determined in light of the approved new proposed security camera deployment, via the display device, and
transmitting the second proposed security camera deployment having the second proposed location different from the first proposed location, determined in light of the approved new proposed security camera deployment, to a reviewing agent computing device.

11. The method of claim 1, further comprising providing indications, via the display device, of each of the existing tiered camera deployments at the first tier and an input mechanism by which full control of each first tier camera can be accessed.

12. The method of claim 1, further comprising providing indications, via the display device, of each of the existing tiered camera deployments at the second tier and an input mechanism by which live video access for each second tier camera can be accessed.

13. The method of claim 1, further comprising providing indications, via the display device, of each of the existing tiered camera deployments at the third tier and an input mechanism by which a copy of locally stored video content can be requested to a registered owner of each second tier camera.

14. The method of claim 1, wherein the new proposed security camera deployment having the first proposed location is an upgrade to a higher first or second access tier of an existing deployed camera of the second or third access tier.

15. A system comprising:
at least one processor; and
at least one memory coupled to the at least one processor, the at least one memory containing a set of instructions thereon that when executed by the at least one processor cause the at least one processor to perform a set of functions, the set of functions comprising:
retrieving existing tiered camera deployment entries, each entry in a database including a geographic location of a respective existing tiered camera deployment, and a respective access tier identifier selected from one of at least a first tier in which a security agency has full control over or ownership of the existing tiered camera deployment, a second tier in which the security agency has live video access for the existing tiered camera deployment but less than full control or ownership, and a third tier in which the security agency has no live video access for the existing tiered camera deployment but previously recorded video is obtainable;

retrieving electronically stored indications of crime rates across a geographic area associated with the security agency, the crime rates varying in intensity over the geographic area;

correlating the geographic location and the tier of the existing tiered camera deployments with the electronically stored indications of crime rates across the geographic area associated with the security agency;

generating at least one new proposed security camera deployment at at least a first proposed location in the geographic area associated with the security agency having a proposed tier selected from the one of the first, second, and third tiers determined as a function of the correlating; and causing to be displayed at least one of the proposed tier and the new proposed security camera deployment having the first proposed location via a display device communicatively coupled to at least one input device operable to approve or reject the new proposed security camera deployment.

16. A non-transient computer readable medium storing program instructions for causing a computer to perform a set of functions, the set of functions comprising:

retrieving, from an at least one electronic memory of the computer, existing tiered camera deployment entries, each entry in a database including a geographic location of a respective existing tiered camera deployment, and a respective access tier identifier selected from one of at least a first tier in which a security agency has full control over or ownership of the existing tiered camera deployment, a second tier in which the security agency has live video access for the existing tiered camera deployment but less than full control or ownership, and a third tier in which the security agency has no live video access for the existing tiered camera deployment but previously recorded video is obtainable;

retrieving, from the at least one electronic memory of the computer, electronically stored indications of crime rates across a geographic area associated with the security agency, the crime rates varying in intensity over the geographic area;

correlating the geographic location and the existing tiered camera deployments with the electronically stored indications of crime rates across the geographic area associated with the security agency;

generating at least one new proposed security camera deployment at at least a first proposed location in the geographic area associated with the security agency having a proposed tier selected from the one of the first, second, and third tiers determined as a function of the correlating; and causing to be displayed, via a display communicatively coupled to the computer, at least one of:

the proposed tier, and the new proposed security camera deployment, having the first proposed location, to be approved or rejected by operation of at least one input device of the computer.

\* \* \* \* \*